(12) United States Patent
Krol

(10) Patent No.: US 11,254,523 B1
(45) Date of Patent: Feb. 22, 2022

(54) SLIDE MECHANISM FOR STACKER

(71) Applicant: McCloskey International Limited, Keene (CA)

(72) Inventor: Andrzej Krol, Keene (CA)

(73) Assignee: McCloskey International Limited, Keene (CA)

(*) Notice: Subject to any disclaimer, the term of this patent is extended or adjusted under 35 U.S.C. 154(b) by 0 days.

(21) Appl. No.: 17/030,798

(22) Filed: Sep. 24, 2020

(51) Int. Cl.
*B65G 65/28* (2006.01)
*B65G 41/00* (2006.01)
*B65G 21/14* (2006.01)

(52) U.S. Cl.
CPC ............ *B65G 65/28* (2013.01); *B65G 21/14* (2013.01); *B65G 41/005* (2013.01); *B65G 41/008* (2013.01)

(58) Field of Classification Search
None
See application file for complete search history.

(56) References Cited

U.S. PATENT DOCUMENTS

| 4,135,614 A | 1/1979 | Penterman et al. |
| 4,345,680 A | 8/1982 | Kay |

(Continued)

FOREIGN PATENT DOCUMENTS

| CA | 3035463 | 4/2018 |
| CA | 2985907 | 12/2018 |

(Continued)

OTHER PUBLICATIONS

KPI-JCI & Astec Mobile Screens, an Astec Brand; SuperStacker® Product Overview; https://www.youtube.com/watch?v=onZsMbHdybl; Uploaded May 2, 2018; Running Time 2:31.

*Primary Examiner* — Kavel Singh
(74) *Attorney, Agent, or Firm* — Schwabe, Williamson & Wyatt, P.C.

(57) ABSTRACT

A system for eliminating the need to reposition a tracked/wheeled radial stacker during stacking operations is provided, the stacker having a linear conveyor having front and rear portions, the front and rear portions being displaceable between raised and lowered positions, a bogie having a pair of continuous tracks that are selectively elevated off the ground, a pair of wheels mounted to the bogie that are displaced upwardly and downwardly, the wheels defining axes that may be shifted to position the wheels in either a substantially radial or substantially longitudinal direction, and a hydraulic cylinder system mounted to the wheels for displacing the wheels upwardly to lower the tracks to the ground or downwardly to elevate the tracks off the ground. A pair of hydraulically driven, telescoping frame members may extend rearwardly from the bogie to a mounting system that mounts the frame members to the conveyor, the mounting system defining a longitudinally extending slot with a trolley slidably mounted to the slot, the telescoping frame members being mounted to the trolley at spaced mounting points so that by extending and retracting the frame members, the rear portion of the conveyor can be raised and lowered, thereby changing inclination of the conveyor, wherein the trolley moving longitudinally in the slot takes up longitudinal movement of the conveyor as the inclination of the conveyor is changed.

8 Claims, 8 Drawing Sheets

(56) References Cited

U.S. PATENT DOCUMENTS

| | | | |
|---|---|---|---|
| 4,538,722 A * | 9/1985 | Sumner | B65G 41/008 104/7.1 |
| 4,813,839 A | 3/1989 | Compton | |
| 6,003,658 A * | 12/1999 | Best | B65G 13/12 193/35 TE |
| 6,129,196 A | 10/2000 | Lapper et al. | |
| 6,471,031 B1 | 10/2002 | Duncalf | |
| 7,223,059 B2 | 5/2007 | Smith et al. | |
| 8,123,019 B2 | 2/2012 | Johannsen | |
| 8,739,956 B2 * | 6/2014 | Smith | B65G 41/008 198/306 |
| 10,183,811 B1 | 1/2019 | McCloskey et al. | |
| 2012/0048674 A1 | 3/2012 | Smith et al. | |
| 2013/0048465 A1 | 2/2013 | Friesen | |
| 2017/0327024 A1 | 11/2017 | Ozinga | |
| 2018/0148280 A1 | 5/2018 | McCloskey et al. | |

FOREIGN PATENT DOCUMENTS

| | | |
|---|---|---|
| CN | 204823276 | 12/2015 |
| EP | 2883819 A1 | 6/2015 |
| GB | 2478824 A1 | 9/2011 |
| JP | 6451585 | 3/1989 |
| WO | 2011151378 A1 | 12/2011 |
| WO | 20120167694 | 12/2012 |
| WO | 2017027605 | 2/2017 |

\* cited by examiner

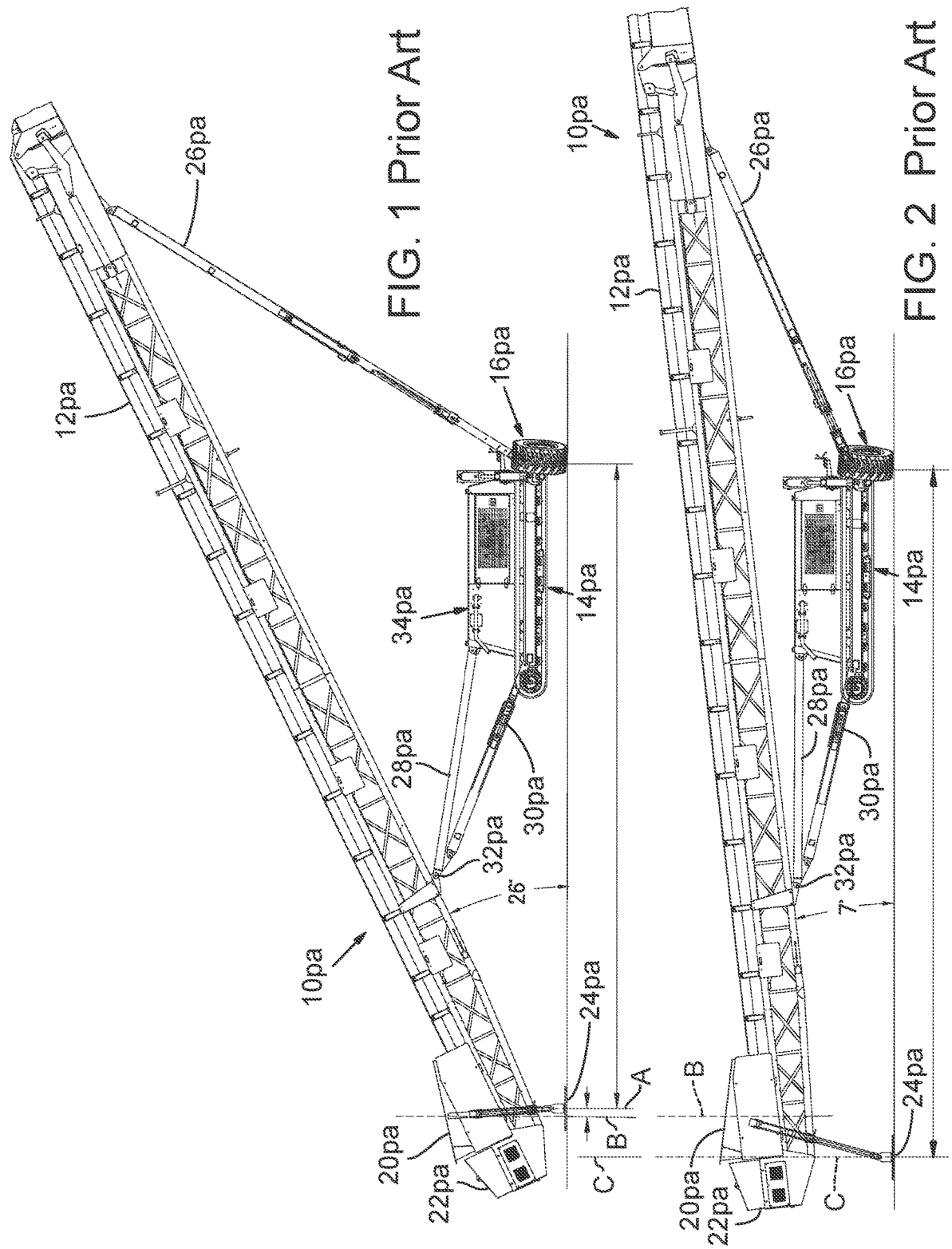

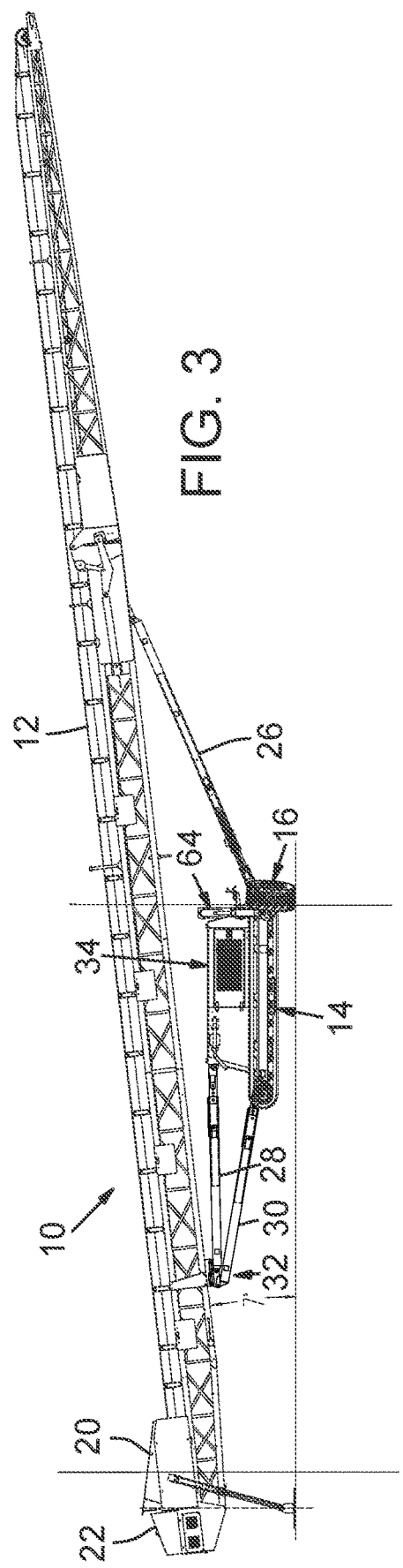

SLIDE MECHANISM FOR STACKER

TECHNICAL FIELD

Embodiments herein relate to tracked, portable radial belt conveyors with wheels used to convey bulk material from a first location to a second location, and a system for changing the inclination of the conveyor.

BACKGROUND

Portable radial stackers have been used for many years to stack bulk materials such as aggregate for road construction, grain and coal. Radial stackers, which swing around in a radius to stack material in an arc, permit substantially more material to be stacked than is possible using a conventional stationary stacker that permits only a single conical stack.

Radial stackers typically include a wheeled axle disposed between a hopper and the top of the stacker from which the material is discharged. The wheels permit the stacker to be swung in an arc, with the hopper including a pivot plate on which the stacker pivots.

In recent years, tracked drives have been used in quarries, agricultural and mining operations to enable equipment to be moved over harsh terrain for ideal positioning for stacking operations. While tracked vehicles have proven to be of great benefit for such purposes, the use of tracks instead of wheels makes it more difficult to shift a stacker radially to facilitate the stacking of material in an arc instead of a cone. Also, because tracked vehicles are not typically permitted to be driven on road surfaces, they are normally loaded onto flatbed trucks for transit from one work site to another. These two drawbacks with the use of tracks has to a certain extent limited the use of tracked vehicles.

McCloskey International has developed a line of stackers with both tracks and wheels in which the wheels can pivot by so the stacker can either be operated in a radial fashion at a job site or can be operated in a longitudinal disposition to permit the stacker to be hauled down a road. Such systems are disclosed in the following U. S. patents, all of which are incorporated by reference: U.S. Pat. Nos. 10,011,443; 10,414,598; 10,414,599; 10,450,153; 10,556,752; and 10,683,177. Another more primitive design in that it does not include pivotable wheels is disclosed in EP 2883819.

While these prior systems exhibit many advantages over the prior art, one feature that is common to most of them is that as the angle of inclination of the conveyor is changed, the rear end where the hopper is disposed is longitudinally shifting its position as the conveyor arcs upwardly and downwardly. In smaller units or units where the position of the feeder can be easily adjusted, this may not be much of a drawback. However, in large stackers with conveyors that might extend 150 feet or more, this shifting may be quite dramatic. Or, where the feeder to the hopper cannot be moved, the entire stacker may need to be moved rearwardly or forwardly, which may not be a straightforward operation when the stacker is supported on radially-extending wheels.

Slider/trolleys have sometimes been incorporated into wheeled stackers to reduce the tendency of the rear of the stacker to shift longitudinally with changes in the inclination of the conveyor. However, such systems have not generally been incorporated into modern stackers having both wheels and tracks and in any event are limited in the manner in which they can change the inclination of the conveyor while utilizing a slider/trolley.

BRIEF DESCRIPTION OF THE DRAWINGS

Embodiments will be readily understood by the following detailed description in conjunction with the accompanying drawings and the appended claims. Embodiments are illustrated by way of example, and not by way of limitation, in the figures of the accompanying drawings.

FIG. 1 is a side elevation view of a prior art stacker with the conveyor at an inclination angle of 26 degrees showing the longitudinal position of the hopper and the rear portion of the conveyor;

FIG. 2 is a side elevation view of the prior art stacker of FIG. 1 with the conveyor at an inclination angle of 7 degrees showing that the longitudinal position of the hopper and the rear portion of the conveyor has shifted rearwardly as the inclination angle has been reduced;

FIG. 3 is a side elevation view a preferred embodiment with the conveyor at an inclination angle of 7 degrees;

DETAILED DESCRIPTION OF DISCLOSED EMBODIMENTS

Figure 4:
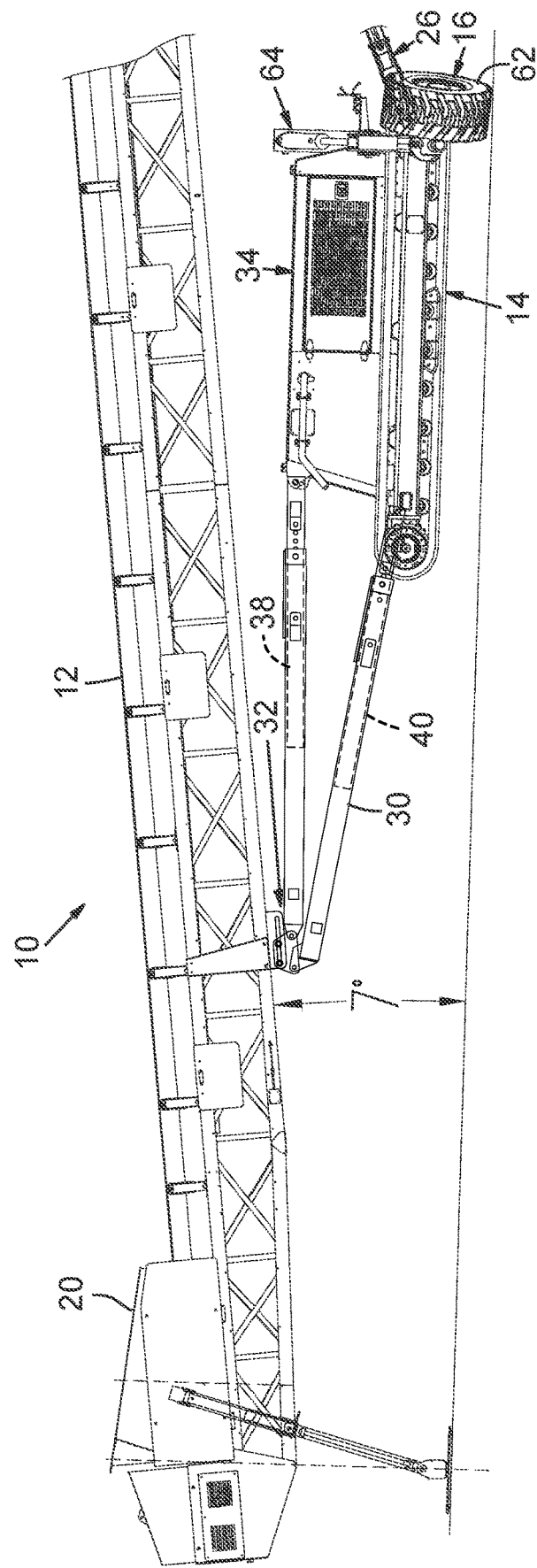
FIG. 4 is an enlarged side elevation view the preferred embodiment with the conveyor at an inclination angle of 7 degrees.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments. However, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity. Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

One aspect of the invention is a tracked, portable radial stacker for stockpiling bulk material. The stacker may include a linear conveyor having a rear portion and a front portion designed to carry bulk material from a lower position adjacent the rear portion to a raised position adjacent the front portion. A continuous track system may also be included with a carriage frame to which the conveyor is mounted. The track system may include a pair of driven, parallel tracks designed to be selectively raised off the ground. A pair of wheels may be mounted to the carriage frame, the wheels being displaceable between a raised radial position in which they do not contact the ground and a first lowered position in which the pair of wheels are radially disposed and engage the ground to facilitate radial conveyance of the conveyor. The pair of wheels may be pivotally mounted to the carriage frame such that they can pivot to a raised, substantially longitudinal position and can be lowered to a second lowered position in which the pair of wheels are longitudinally disposed and engage the ground to facilitate longitudinal conveyance of the conveyor. Wheel displacement means may be provided for powering the pair of wheels from the raised positions to the lowered positions such that when moving the pair of wheels to the lowered positions, the wheel displacement means lifts the tracks off the ground to permit the conveyor to be conveyed in radial or longitudinal directions depending on the position of the pair wheels. The stacker may also include a forwardly extending, hydraulically-powered, telescoping frame member extending from the frame to the front portion of the conveyor for raising and lowering the conveyor.

A mounting system may be fixed to the rear portion of the conveyor, with upper and lower rearwardly extending, hydraulically-powered, telescoping frame members extending between the carriage frame and the mounting system for controlling the elevation of the rear portion of the conveyor and thereby controlling inclination of the conveyor. The mounting system may define a longitudinally extending slot, with a trolley slidably mounted within the slot. The rearwardly extending frame members may be pivotally mounted to the trolley so that as the rearwardly extending frame members telescopingly extend and retract, the trolley slides forwardly and rearwardly in the slot, thereby reducing a tendency of the rear portion of the conveyor to longitudinally shift as the degree of inclination of the conveyor is changed.

The mounting system may include a plate that is fixed to the conveyor, and the slot may be defined in the plate. The rearwardly extending frame members may be mounted to the trolley at a pair of longitudinally spaced mounting points. The trolley may be slidably mounted to the slot by a pair of rollers.

The reduction of the tendency of the rear portion of the conveyor to longitudinally shift as the degree of inclination of the conveyor is changed may largely eliminate the need to reposition the stacker while the stacker is operating.

A hopper may be positioned at the rear portion of the conveyor, and a pivot pad may be disposed below the hopper on which the stacker pivots as the conveyor is being radially shifted from one position to another, whereby the reduction of the tendency of the rear portion of the conveyor to longitudinally shift as the degree of inclination of the conveyor is changed largely eliminates the need to reposition the pivot pad while the stacker is operating.

Another aspect of the invention may provide a system for eliminating the need to reposition a tracked/wheeled radial stacker during stacking operations, the stacker having a linear conveyor having front and rear portions, the front and rear portions being displaceable between raised and lowered positions, a bogie having a pair of continuous tracks that are selectively elevated off the ground, a pair of wheels mounted to the bogie that are displaced upwardly and downwardly, the wheels defining axes that may be shifted to position the wheels in either a substantially radial or substantially longitudinal direction, and a hydraulic cylinder system mounted to the wheels for displacing the wheels upwardly to lower the tracks to the ground or downwardly to elevate the tracks off the ground.

In that stacker, a pair of hydraulically driven, telescoping frame members may extend rearwardly from the bogie to a mounting system that mounts the frame members to the conveyor, the mounting system defining a longitudinally extending slot with a trolley slidably mounted to the slot, the telescoping frame members being mounted to the trolley at spaced mounting points so that by extending and retracting the frame members, the rear portion of the conveyor can be raised and lowered, thereby changing inclination of the conveyor, wherein the trolley moving longitudinally in the slot takes up longitudinal movement of the conveyor as the inclination of the conveyor is changed.

The mounting system may include a plate fixed to the underside of the conveyor and wherein the slot is defined in the plate, the slidable mounting of the trolley within the slot comprises a plurality of rollers that facilitate the trolley moving rearwardly in the slot as the inclination of the conveyor is reduced and moving forwardly as the inclination of the conveyor is increased.

FIGS. 1 and 2 represent views of a prior art McCloskey International stacker, generally as disclosed in the aforementioned McCloskey patents. The stacker, identified generally at 10*pa* (for "prior art"), includes a conveyor 12*pa*, a track system 14*pa*, a wheel system 16*pa*, a hopper 20*pa*, a counterweight 22*pa*, and a pivot pad 24*pa*. The figures show the track system 14*pa* elevated off the ground with wheel system 16*pa* supporting the track system off the ground, the wheel system being in a radial disposition (sometimes referred to herein as a lateral disposition). With the tracks and wheels in this position, the stacker can be shifted radially to pivot on pivot pad 24*pa* so that bulk material can be stacked in an arc-shaped stack or in a plurality of stacks arrayed in an arc.

Wheel system 16*pa* can be raised so track system 14*pa* contacts the ground to permit the stacker to be maneuvered around a work site. With the wheel system in this elevated position, the wheels can be pivoted by so that they extend in a longitudinal direction for movement of the stacker in a longitudinal direction when the wheels are lowered to the ground.

Stacker 10*pa* also includes a pair of forwardly extending, telescoping support frames 26*pa* on each lateral side of conveyor 12*pa*. The extension and retraction of these frames is controlled and driven by a pair of hydraulic rams, one in each forward support frame. Two pairs of rearwardly extending support frames 28*pa* and 30*pa* are also included, again with one of the pair on each side of the conveyor. Only one of the pair of support frames shows in the depicted stacker so from this point on the pair will be described as a single frame. Each of the rearwardly extending support frames 28*pa* and 30*pa* connect to conveyor 12*pa* at a common pivot point 32*pa*. Upper rear support frame 28*pa* and lower rear support frame 30*pa* typically extend rearwardly from a carriage frame 34*pa*. The top rearwardly extending support frame 28*pa* is typically not telescoping while the lower rearwardly extending support frame 30*pa* typically is telescoping and incorporates a hydraulic ram to control the extension and retraction thereof.

In operation, the inclination of conveyor 10*pa* is regularly adjusted to accommodate for the ever-increasing height of the stack. Changing the inclination is performed by extending or retracting forward support frame 26*pa* and lower rear support frame 30*pa*. FIGS. 1 and 2 show conveyor 12*pa* at 26 degrees of inclination and 7 degrees of inclination, respectively. Vertical lines A and B show how, as the angle of inclination of the conveyor is decreased, the rear of the conveyor, including hopper 20*pa* and counterweight 22*pa*, shifts rearwardly or to the left in the figures. Vertical line C shows how counterweight 22*pa* also shifts with the longitudinal movement of the conveyor. Some prior art stackers of the type depicted in FIGS. 1 and 2 even include a wheel or a wheeled bogie to allow for longitudinal movement of the rear of the stacker as the angle of inclination is changing.

Even a small amount of longitudinal shift of one foot or so can be significant because it may require the chute or conveyor that is loading the hopper to be moved. With longer conveyors, such as those extending 150 feet or more, the shift may be significantly more than one foot. In any event, with certain arrangements, it may not be practical to move the loading system so the stacker itself may have to be moved. This can be problematic, as wheel system 16*pa* is typically on the ground in the radial (depicted) position. With the wheel system in this radial position, movement of the stacker in a longitudinal direction would require the wheels to be elevated, shifted to a longitudinal disposition, and then lowered to the ground. Moreover, with the conveyor in an elevated position as shown in FIG. 1, the stacker can be somewhat unstable, especially if it is on uneven ground or in windy conditions. Moving the stacker under these conditions may not be practical or safe.

The disclosed embodiment overcomes or at least minimizes the longitudinal shifting of the stacker as the degree of elevation of the stacker is changed. As shown in FIGS. 3-8B, stacker 10 may be similar to stacker 10*pa* except for rear support frames 28 and 30 and the mounting of those frames to conveyor 12. Stacker 10 therefore may include a conveyor 12, a track system 14, a wheel system 16, a hopper 20, a counterweight 22, and a pivot pad 24. The track system and wheel system may sometimes be referred to herein as a bogie.

As shown best in FIG. 3, a telescoping forward support frame 26 extends from a carriage frame 34 in the same fashion as 26*pa*. Like forward support frame 26*pa*, forward support frame 26 includes a hydraulic ram drive. An upper rear support frame 28 and a lower rear support frame 30 extend rearwardly from carriage frame 34. As with stacker 10*pa*, a pair of upper and lower support frames are typically included, one of each pair of support frames on each lateral side of the conveyor. However, as with the discussion of stacker 10*pa*, this description will continue with reference being made to only one of each pair of rear support frames 28 and 30 because that is all that shows in the figures.

Unlike stacker 10*pa*, both of the rear support frames 28 and 30 may be telescoping and hydraulically driven to extend and retract with internal drive cylinders 38 and 40. An array of aligned holes 42 and 44 may be included in frames 28 and 30, respectively. Pegs 46 and 48 may be provided for locking the degree of extension of rear support frames 28 and 30, respectively, once the correct degree of telescoping extension is set. While the peg and hole system is not necessary for the proper operation of stacker 10, by permitting the degree of extension to be locked, force is removed from the hydraulic system for extending and retracting the rear support frames.

Figure 5:
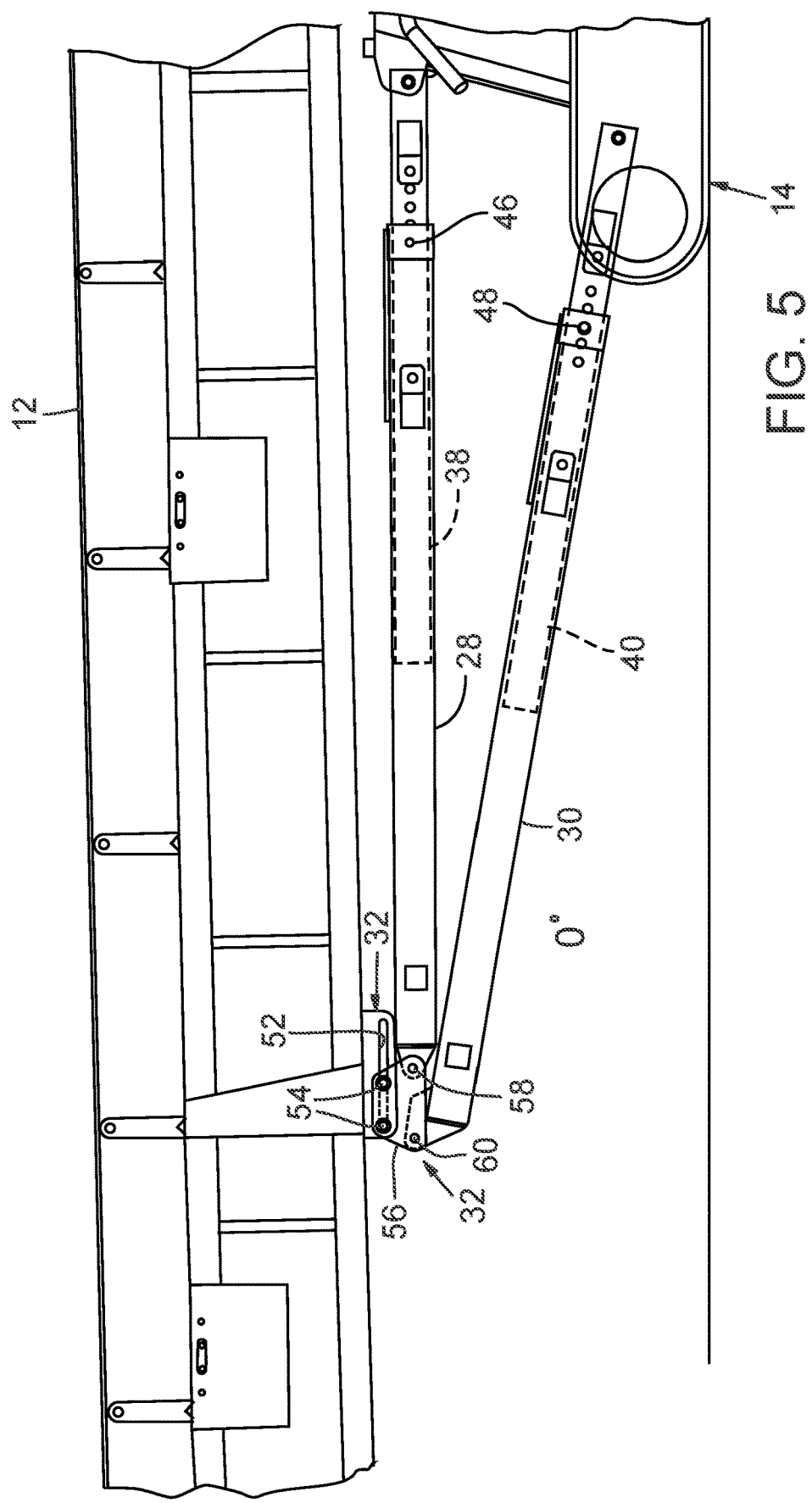
FIG. 5 is a further enlarged side elevation view of the preferred embodiment showing the slide mounting of the rearward telescoping members to the conveyor.
Figure 7A:
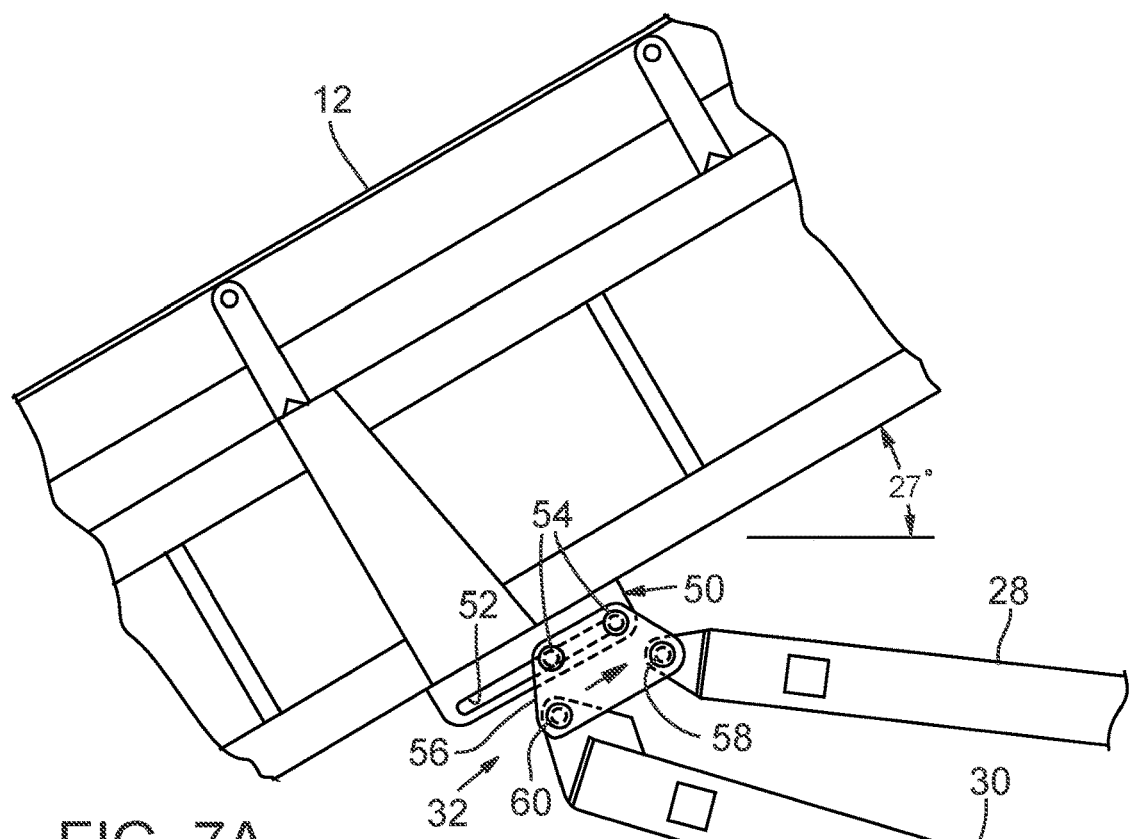
FIGS. 7A and 7B are enlarged fragmentary views of the preferred embodiment showing the positions of the slide mounting with the conveyor at 27 and 7 degrees, respectively.
Figure 7B:
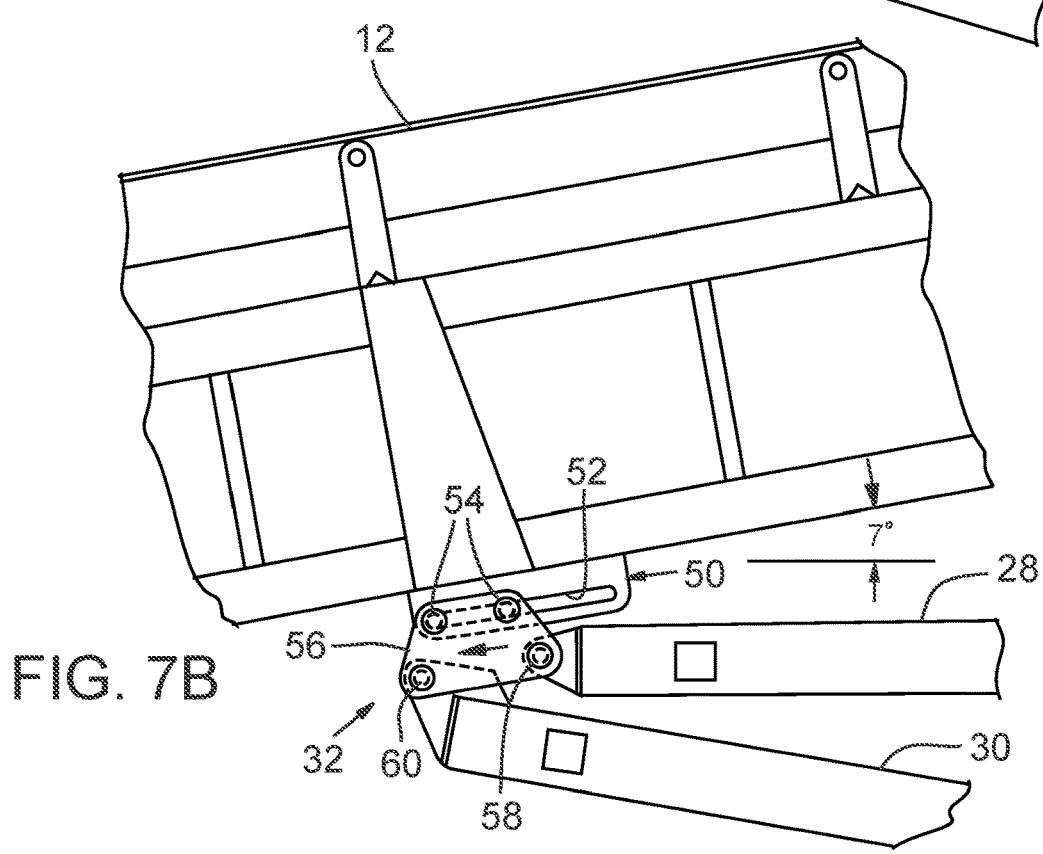

Upper and lower rear support frames 28 and 30 are mounted to conveyor 12 at a mounting system 32. A mirror image of the mounting system is found on the opposite side of the conveyor but, again, because only one side of the stacker is being depicted, only the one mounting system 32 that shows in the figures will be described. The mounting system is best shown in FIGS. 5, 7A and 7B. Mounting system 32 may include a mounting plate 50 that is fixed to conveyor 12. The mounting plate may include a longitudinally extending slot 52 in which a pair of rollers 54 may be mounted. The depicted rollers 54 are rotatably mounted to a trolley 56 to which rear support frames 28 and 30 are pivotally mounted at mounting points 58 and 60.

Trolley 56 is designed to roll forwardly and rearwardly within slot 52 as the degree of elevation of conveyor 12 is increased and decreased. Specifically, when the conveyor is in its highest degree of elevation, such as shown at 27 degrees in FIGS. 6 and 7A, trolley 56 has slid to its forward-most position in slot 52. For stackers that are designed to be raised to even a steeper degree of elevation, the trolley would be designed to slide to its forward-most position in the slot at that highest degree of elevation. When conveyor 12 is at an intermediate degree of inclination, such as 22 degrees in FIG. 8A, trolley 56 is most but not all of the way forward within slot 52. When the conveyor is at a low point of elevation, such as 7 degrees as depicted in FIGS. 3-5, 6B and 7B, trolley 56 slides on rollers 54 to the rearward position within slot 52.

The rolling of trolley 56 from one end of slot 52 to the other happens naturally, that is without an independent drive system, as rear support frames 28 and 30 are extended and retracted to increase and decrease the degree of elevation of conveyor 12. Specifically, the use of two hydraulically driven rear support frames instead of the one found in prior stackers dramatically increases the flexibility the operator has in controlling the degree of elevation of the conveyor. The extension and retraction of rear support frames 28 and 30 is coordinated with the extension and retraction of forward support frame 26. This may be performed manually by the operator using remote controls or may be performed in an automated mode. In any event, as the degree of elevation of conveyor 12 is changed, trolley 56 automatically rolls within slot 52 of mounting system 32.

By including mounting system 32, the longitudinal shifting of conveyor 12 as the elevation of the conveyor is changed is eliminated; that is, instead of the entire conveyor shifting longitudinally, that shift is largely taken up in mounting system 32 and slot 52. This eliminates the need to shift the loading system, whether it be a chute or a loading conveyor. And, more importantly, this eliminates the need to shift the stacker to make sure the loading system is pouring its load into the center of hopper 20.

Figure 6:
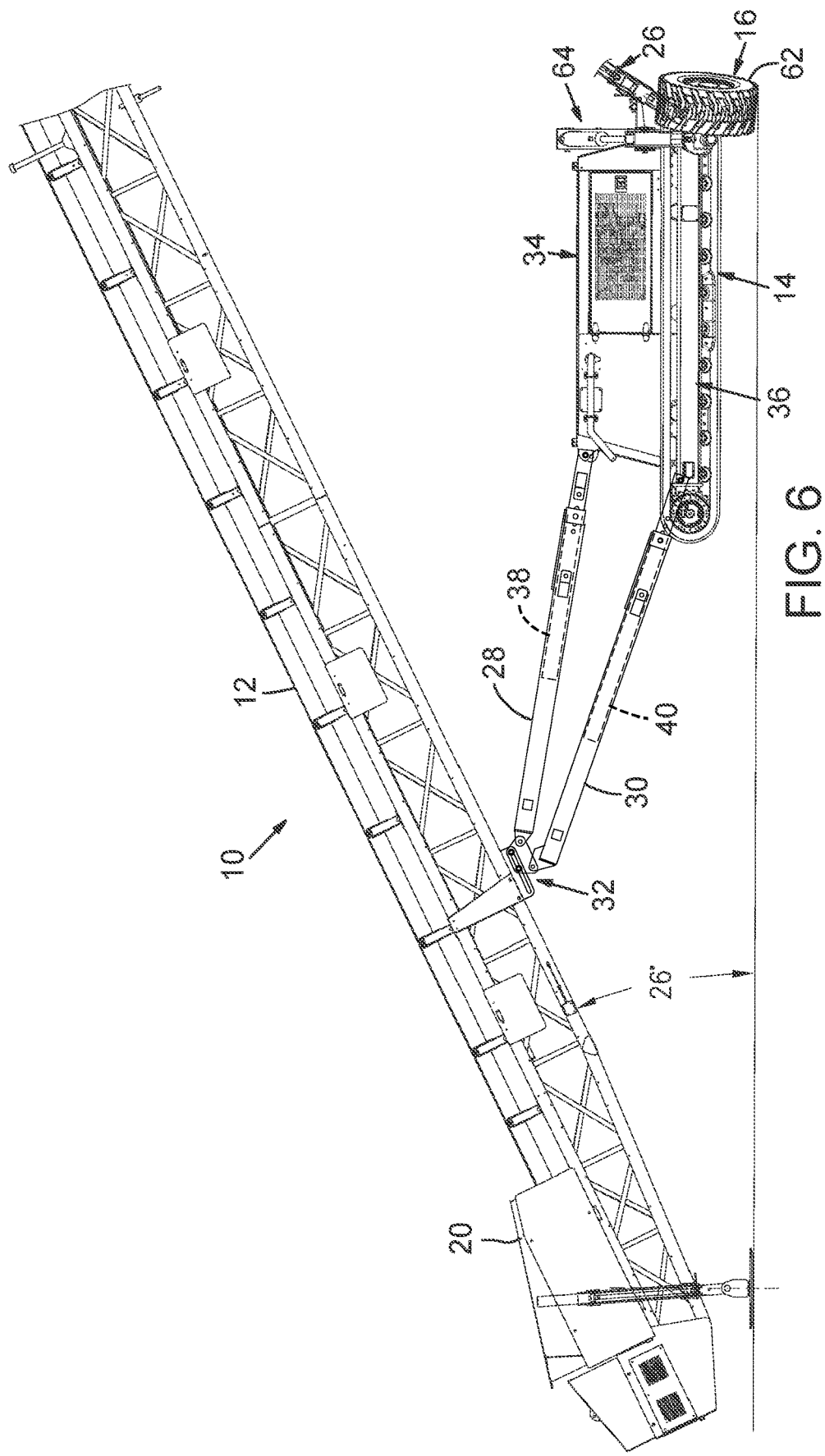
FIG. 6 is a fragmentary side elevation views of the preferred embodiment with the conveyor at 27 degrees.
Figure 6A:
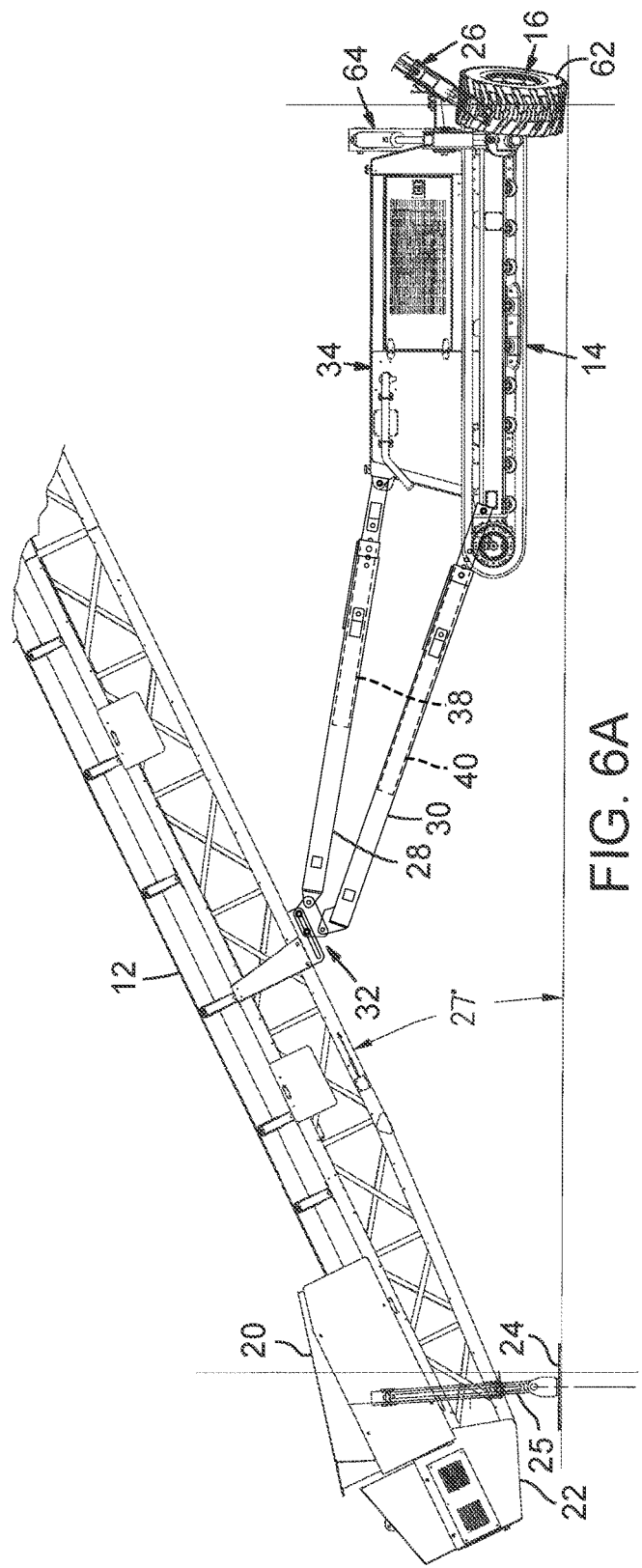
FIGS. 6A and 6B are enlarged fragmentary views of the preferred embodiment showing how the pivot pad does not necessarily need to be moved as the inclination of the conveyor is dramatically changed.
Figure 6B:
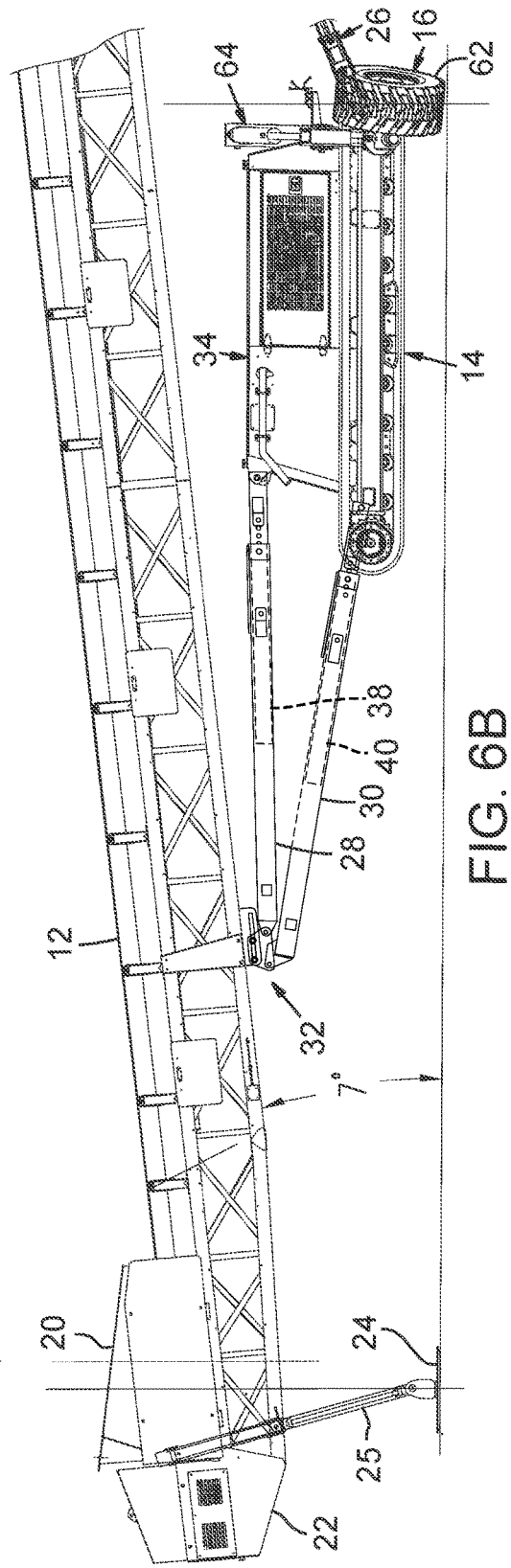

FIGS. 6A and 6B show a slight shift of the rear portion of the stacker to the left as the inclination of conveyor 12 is reduced. This is due to the rear of the stacker being elevated by a hydraulic leg 25 extending from pivot pad 24 to hopper 20. If this rearward shift presents a problem with loading hopper 20, the provision of the two hydraulically operated rear frame members 28 and 30 facilitates the retraction of those frame members to thereby draw the stacker forward or to the right in the figures. This presents a big advantage over conventional stackers that typically include two rear frame members, only one of which is hydraulically telescoping (see 28*pa* and 30*pa* in FIGS. 1 and 2). By retracting rear frame members 28 and 30 as hydraulic leg 25 is being extending, it will often be possible to keep pivot pad in its original position rather than causing it to be shifted slightly to the rear as shown in FIG. 6B.

Figure 8A:
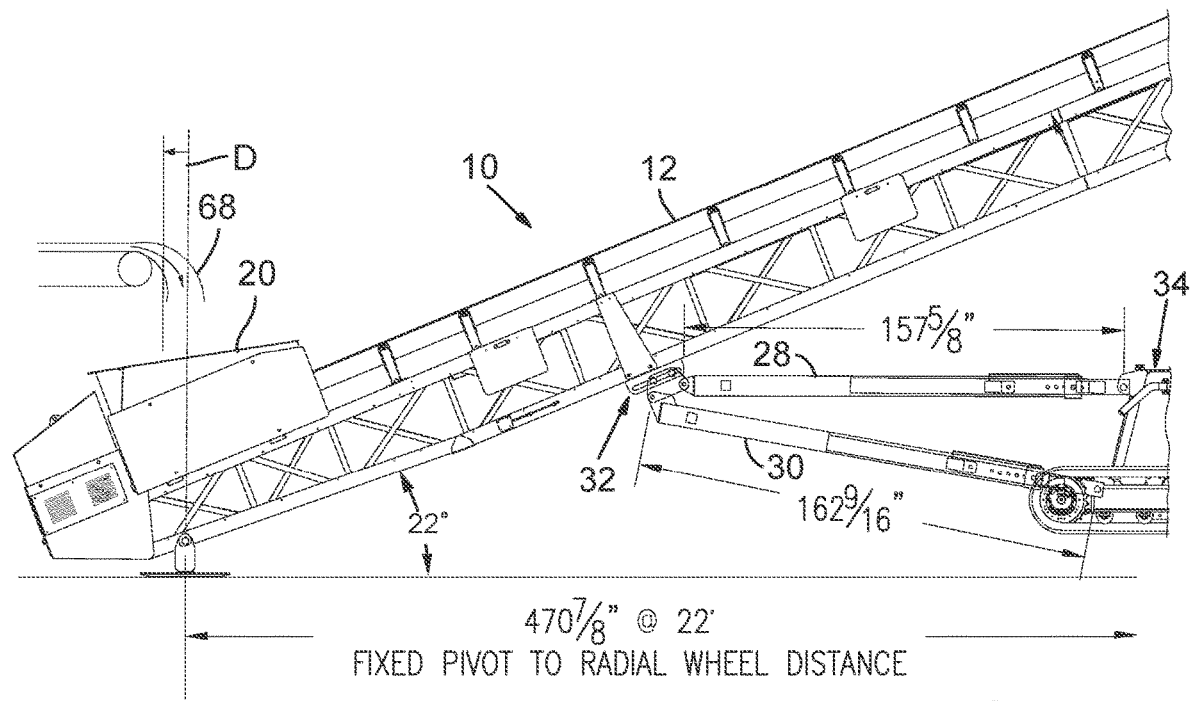
FIGS. 8A and 8B are fragmentary side elevation views of the preferred embodiment showing that the hopper and the rear end of the stacker do not shift rearwardly as the angle on inclination of the conveyor is reduced.
Figure 8B:
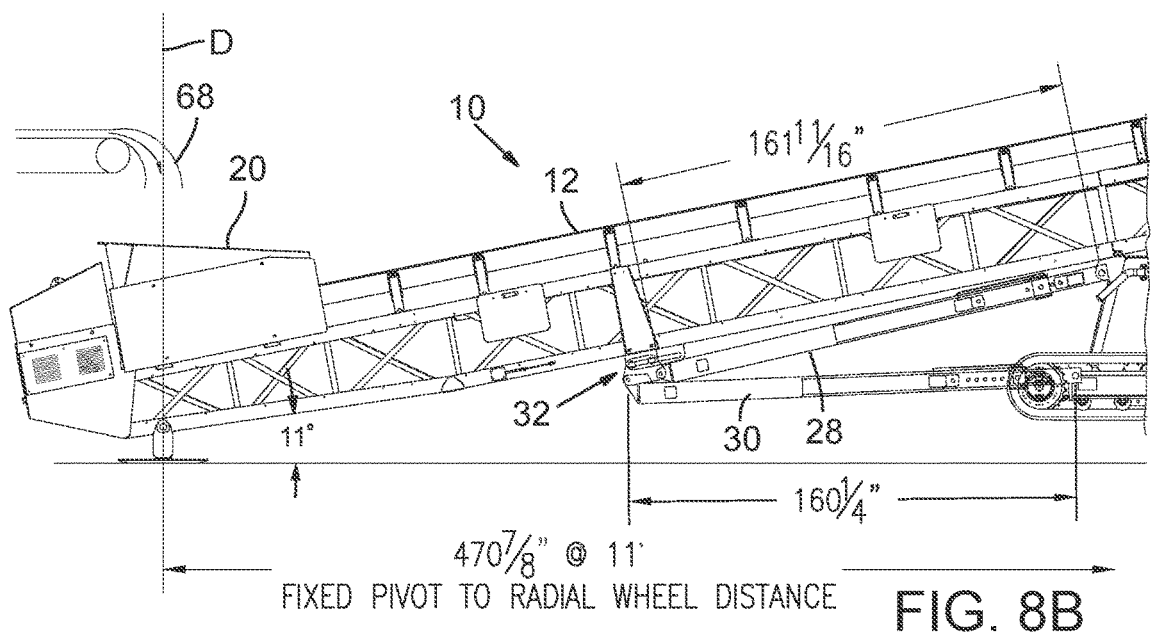

It can be seen in FIGS. 8A and 8B that the rear end of the stacker does not shift rearwardly as the degree of elevation of the conveyor is decreased or forwardly as the degree of elevation of the conveyor is increased. An additional advantage of this feature is that pivot pad 24 does not need to be moved, regardless of the degree of elevation of the conveyor. This is to be distinguished from the prior art system shown in FIGS. 1 and 2, in which the pivot pad 24*pa* often needs to be relocated as the degree of inclination of the conveyor is changed. It is common but not necessary that the hydraulic leg to pivot pad 24 be retracted in order to shorten the leg to hopper 20, as shown in FIGS. 8A and 8B, when the angle of elevation of the conveyor is being changed.

FIGS. 8A and 8B show a loading conveyor loading bulk material 68 being dumped into hopper 20. It should be understood, however, that any conventional loading system may be used with stacker 10 and this versatility adds to the value of the disclosed embodiment.

These last two figures display some typical dimensions of a stacker such as stacker 10. While these dimensions should not be considered limiting, as illustrated by vertical line D in FIGS. 8A and 8B, the dimensions demonstrate that even with the degree of inclination of the conveyor is shifted and the effective length of the telescoping rear support frames 28 and 30 is changed, the distance between pivot pad 32 and the wheels 62 of wheel system 16 does not change. This demonstrates how effective the present system is and how the use of two telescoping, powered rear support frames such as 28 and 30 provides greater flexibility to the operator.

Wheels 62 do not appear in these two figures but they have been identified in several of the other figures. Other figures also show other parts of stacker 10, including a hydraulic cylinder system 64 for raising and lowering wheels 62. Hydraulic cylinder system 64 typically includes hydraulic cylinders for raising and lowering wheels 62 on each lateral side of conveyor 12. Carriage frame 34 supports an engine 36, which provides hydraulic power for the entire stacker and driving power for tracks 66.

As is known in the art and as mentioned above, when wheels 62 are in their laterally or radially disposed position depicted, the stacker can rotate about pivot pad 32 to create either an arc-shaped stack or a plurality of stacks arrayed in an arc. By having hydraulic cylinder system 64 raise wheels 62, tracks 66 are lowered to the ground, facilitating longitudinal as well as radial movement around the work site. When wheels 62 are in their raised position (not shown), they can be rotated to a substantially longitudinal disposition so that when they are lowered and the tracks are thereby elevated, the stacker can is ready to be pulled down a highway without the need to load the stacker on a flatbed truck. By providing the capability of the hydraulic cylinders of hydraulic cylinder systems 64 on each side of conveyor 12 being independently operable to control the positions of the wheels, stacker 10 becomes particularly well suited to being set up on uneven terrain, which is common in quarries and other work sites.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A tracked, portable radial stacker for stockpiling bulk material, comprising:
   a linear conveyor having a rear portion and a front portion and being designed to carry bulk material from a lower position adjacent the rear portion to a raised position adjacent the front portion;
   a continuous track system including a carriage frame to which the conveyor is mounted, the track system also including a pair of driven, parallel tracks designed to be selectively raised off the ground;
   a pair of wheels mounted to the carriage frame that are displaceable between a raised radial position in which they do not contact the ground and a first lowered position in which the pair of wheels are radially disposed and engage the ground to facilitate radial movement of the conveyor, the pair of wheels being pivotally mounted to the carriage frame such that they can pivot to a raised, substantially longitudinal position and can be lowered to a second lowered position in which the pair of wheels are longitudinally disposed and engage the ground to facilitate longitudinal movement of the conveyor;
   wheel displacement means for powering the pair of wheels from the raised positions to the lowered positions such that when moving the pair of wheels to the lowered positions, the wheel displacement means lifts the tracks off the ground to permit the conveyor to be moved in radial or longitudinal directions depending on the position of the pair wheels;

a forwardly extending, hydraulically-powered, telescoping frame member extending from the frame to the front portion of the conveyor for raising and lowering the conveyor;

a mounting system fixed to the rear portion of the conveyor; and upper and lower rearwardly extending, hydraulically-powered, telescoping frame members extending between the carriage frame and the mounting system for controlling the elevation of the rear portion of the conveyor and thereby controlling inclination of the conveyor, wherein the mounting system defines a longitudinally extending slot, and includes a trolley slidably mounted within the slot, and the rearwardly extending frame members are pivotally mounted to the trolley so that as the rearwardly extending frame members telescopingly extend and retract, the trolley slides forwardly and rearwardly in the slot, thereby reducing a tendency of the rear portion of the conveyor to longitudinally shift as the degree of inclination of the conveyor is changed.

2. The stacker of claim 1 wherein the mounting system includes plate that is fixed to the conveyor, and the slot is defined in the plate.

3. The stacker of claim 1 wherein the rearwardly extending frame members are mounted to the trolley at a pair of longitudinally spaced mounting points.

4. The stacker of claim 1 wherein the trolley is slidably mounted to the slot by a pair of rollers.

5. The stacker of claim 1, whereby the reduction of the tendency of the rear portion of the conveyor to longitudinally shift as the degree of inclination of the conveyor is changed largely eliminates the need to reposition the stacker while the stacker is operating.

6. The stacker of claim 1, further comprising a hopper positioned at the rear portion of the conveyor, and a pivot pad disposed below the hopper on which the stacker pivots as the conveyor is being radially shifted from one position to another, whereby the reduction of the tendency of the rear portion of the conveyor to longitudinally shift as the degree of inclination of the conveyor is changed largely eliminates the need to reposition the pivot pad while the stacker is operating.

7. A system for eliminating the need to reposition a tracked/wheeled radial stacker during stacking operations, the stacker having a linear conveyor having front and rear portions, the front and rear portions being displaceable between raised and lowered positions, a bogie having a pair of continuous tracks that are selectively elevated off the ground, a pair of wheels mounted to the bogie that are displaced upwardly and downwardly, the wheels defining axes that may be shifted to position the wheels in either a substantially radial or substantially longitudinal direction, and a hydraulic cylinder system mounted to the wheels for displacing the wheels upwardly to lower the tracks to the ground or downwardly to elevate the tracks off the ground, wherein the system comprises:

a pair of hydraulically driven, telescoping frame members extending rearwardly from the bogie to a mounting system that mounts the frame members to the conveyor, the mounting system defining a longitudinally extending slot with a trolley slidably mounted to the slot, the telescoping frame members being mounted to the trolley at spaced mounting points so that by extending and retracting the frame members, the rear portion of the conveyor can be raised and lowered, thereby changing inclination of the conveyor, wherein the trolley moving longitudinally in the slot takes up longitudinal movement of the conveyor as the inclination of the conveyor is changed.

8. The system of claim 7 wherein the mounting system includes a plate fixed to the underside of the conveyor and wherein the slot is defined in the plate, the slidable mounting of the trolley within the slot comprises a plurality of rollers that facilitate the trolley moving rearwardly in the slot as the inclination of the conveyor is reduced and moving forwardly as the inclination of the conveyor is increased.

* * * * *